United States Patent [19]

Maesaka et al.

[11] Patent Number: 4,731,998
[45] Date of Patent: Mar. 22, 1988

[54] HYDRAULIC SYSTEM IN A WORKING VEHICLE

[75] Inventors: Kiyotomi Maesaka, Koshigaya; Satoshi Matsuzawa, Tokyo, both of Japan

[73] Assignee: Honda Giken Kogyo Kabushiki Kaisha, Tokyo, Japan

[21] Appl. No.: 828,915

[22] Filed: Feb. 13, 1986

[30] Foreign Application Priority Data

Feb. 14, 1985 [JP] Japan .................................. 60-27437
Feb. 14, 1985 [JP] Japan ............................. 60-18302[U]

[51] Int. Cl.⁴ ........................................... F16D 31/02
[52] U.S. Cl. ........................................ 60/435; 60/484; 137/625.47
[58] Field of Search ................................ 60/435, 484; 137/625.47; 180/900

[56] References Cited

U.S. PATENT DOCUMENTS

| | | | |
|---|---|---|---|
| 2,107,760 | 2/1938 | McCormick | 60/435 X |
| 2,621,886 | 12/1952 | Mueller | 137/625.47 |
| 2,702,050 | 2/1955 | Thomas | 137/625.47 X |
| 4,021,214 | 5/1977 | Bush | 62/244 |
| 4,467,604 | 8/1984 | Forster | 60/484 |

Primary Examiner—Harold W. Weakley
Attorney, Agent, or Firm—Armstrong, Nikaido, Marmelstein & Kubovcik

[57] ABSTRACT

In a hydraulic system loaded on a working vehicle, an oil pump is fixedly secured to a casing block of a transmission system disposed on a vehicle body as separated from an engine, an input shaft of this oil pump is drivably coupled to an input shaft of the aforementioned transmission system, and a clutch is interposed between the input shaft and a transmission mechanism of the transmission system. Preferably, a control valve is fixedly secured to the oil pump, and a delivery port of the oil pump is directly coupled to an inlet of the control valve. Furthermore, so improved structures of a hydraulic switching valve adapted to be disposed on an outlet side of the control valve is proposed.

4 Claims, 11 Drawing Figures

HYDRAULIC SYSTEM IN A WORKING VEHICLE

BACKGROUND OF THE INVENTION

1. Field of the Invention

The present invention relates to a hydraulic system provided on a vehicle, and more particularly to a hydraulic system to be used for transmitting power to a working machine, for instance, in an agricultural tractor or the like.

2. Description of the Prior Art

In the heretofore known agricultural tractor or the like, it was a common practice that normally an engine is loaded on a front portion of a vehicle body and a transmission casing is disposed on a rear portion of the vehicle body, thereby wheels were driven by the engine through a transmission system in the transmission casing, and besides the above-mentioned drive system, there was provided a hydraulic system which employed an oil pump driven by the engine as a hydraulic pressure feed source, and a working machine was driven by this hydraulic system. The hydraulic system consists of the above-mentioned oil pump, a control valve and a hydraulic cylinder, delivered oil from the oil pump is controlled by the control valve and fed to the hydraulic cylinder, and the working machine is driven by the intermediary of a piston of the hydraulic cylinder so that the working machine can be, for example, elevated or lowered.

In such a hydraulic system, heretofore the oil pump was mounted to the engine and was directly coupled thereto. On the other hand, the control valve was disposed on the rear portion of the vehicle body remote from the engine for convenience in manipulation, and accordingly, the oil pump and the control valve had to be connected with each other through a relatively long high-pressure piping.

Moreover, since the oil pump would vibrate jointly with the engine, it was necessary to form the above-mentioned high-pressure piping as a flexible piping.

SUMMARY OF THE INVENTION

The present invention aims at improvements in the above-described hydraulic system in the prior art.

According to the present invention, an oil pump is fixedly secured to a casing block of a transmission system disposed on a vehicle body as separated from an engine, an input shaft of this oil pump is drivably coupled to an input shaft of the aforementioned transmission system, and a clutch is interposed between the input shaft of the above-mentioned transmission system and a transmission mechanism of the same transmission system. According to the above-mentioned feature of the present invention, since the oil pump is not directly influenced by vibration of the engine, the high-pressure piping extending from the oil pump need not be formed as a flexible piping, and hence cost of the system can be reduced. In addition, the oil pump can be always driven to transmit power to a working machine when the engine is rotating, regardless of the operating state of the clutch.

In addition, according to the present invention, a control valve is fixedly secured to the oil pump, and a delivery port of the aforementioned oil pump is directly coupled to an inlet of the above-described control valve. Accordingly, a high-pressure piping for connecting the oil pump with the control valve becomes unnecessary, also a piping length can be shortened throughout the entire hydraulic system, and a number of component parts can be reduced.

Furthermore, according to another feature of the present invention, there is provided a hydraulic switching valve adapted to be disposed on an outlet side of the above-mentioned control valve. This hydraulic switching valve is simple and small-sized in structure, provided with an excellent sealing property, further it does not necessitate an especially high machining precision, and hence a machining cost can be lowered.

The above-mentioned and other objects, features and advantages of the present invention will become more apparent from the following detailed description of preferred embodiments of the invention taken in conjunction with the accompanying drawings.

DESCRIPTION OF THE PREFERRED EMBODIMENTS

Now description will be made on the preferred embodiments of the present invention illustrated in the accompanying drawings.

Figure 1:
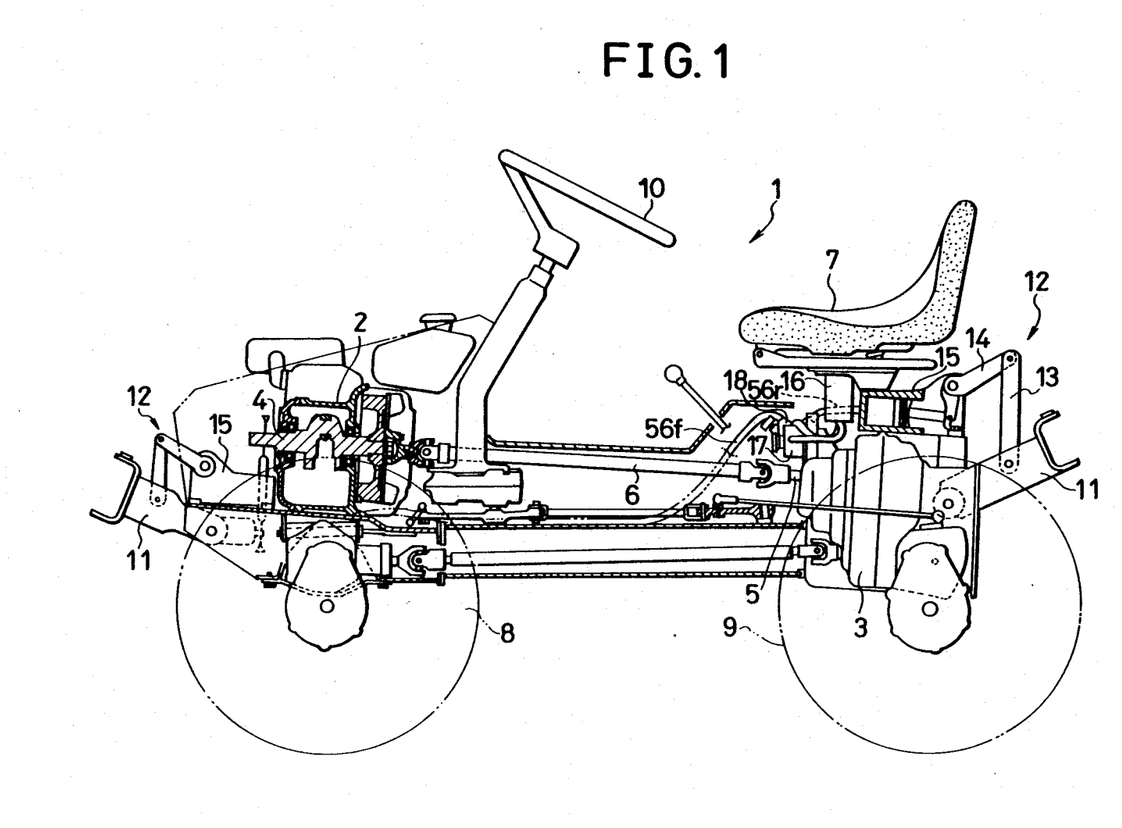
FIG. 1 is a side view partly cut away of an agricultural tractor according to one preferred embodiment of the present invention.

Referring to FIG. 1, which shows an agricultural tractor 1 provided with a hydraulic system according to the present invention, an engine 2 is loaded on a front portion of a vehicle body, and a transmission casing 3 containing a transmission mechanism 3a (FIG. 2) therein is disposed on a rear portion of the vehicle body. A crank shaft 4 of the engine 2 and a transmission input shaft 5 of the transmission casing 3 are connected with each other nearly along a straight line via a drive shaft 6 and universal joints. A rider's seat 7 is provided above the rear portion of the vehicle body, and front wheels 8, 8 as well as rear wheels 9, 9 having the same diameter are provided on the left and right sides of the front and rear portions, respectively, of the vehicle body. This tractor 1 is capable of steering the front and rear wheels by manipulating a steering handle 10, and also 4-wheel drive is possible.

Rocking arms 11 are respectively pivotably mounted to the front and rear portions of the vehicle body so as to be freely rocked up and down, and various kinds of working machines (not shown) are adapted to be mounted to the tip end portions of these rocking arms 11. To each of the rocking arms 11 is pivotably mounted one end of a link member 13 of a linkage 12. Another link member 14 of the linkage 12 is pivotably mounted to a piston within a hydraulic cylinder 15, so that the link member 14 is rocked up and down by reciprocal movements of the piston within the hydraulic cylinder 15 as will be described later, and the rocking arm 11 is rocked by this rocking motion of the link member 14 via the link member 13 to elevate and lower the working machine. An oil tank 16 is disposed under the above-described rider's seat 7, a working oil is fed from this oil tank 16 to the oil pump 17, and an oil delivered from the oil pump 17 is selectively fed to the front and rear hydraulic cylinder 15 via a control valve 18.

Figure 2:
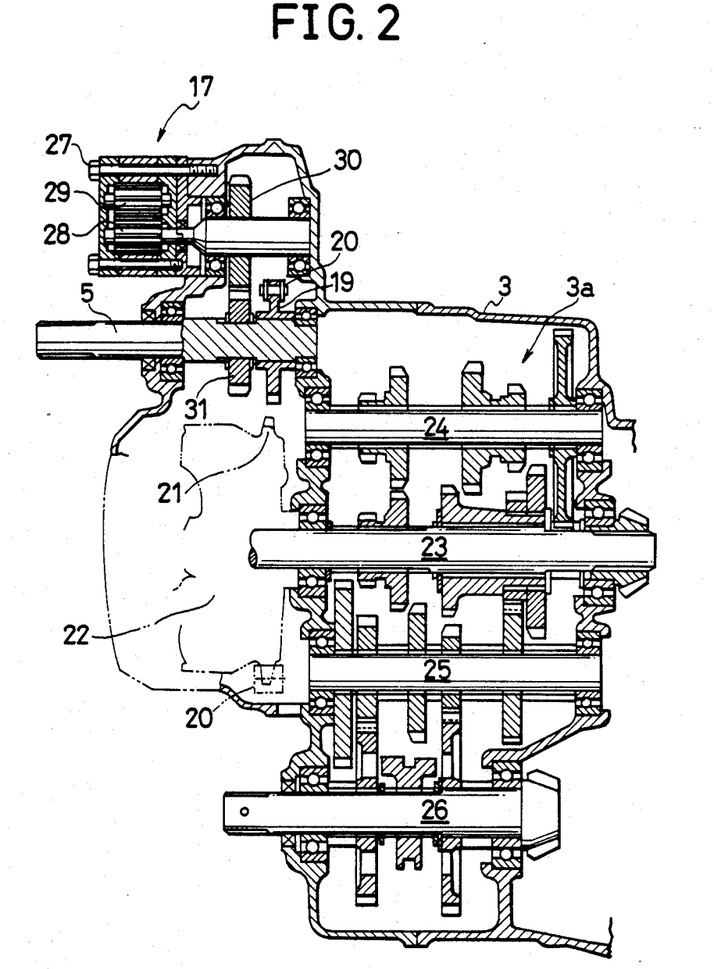
FIG. 2 is a longitudinal cross-sectional side view of a transmission case containing a transmission mechanism therein as well as an oil pump fixedly secured thereto.

The oil pump 17 is fixedly secured to the transmission casing 3. As shown in FIG. 2 which is a longitudinal cross-section side view of the transmission casing 3, the above-mentioned transmission input shaft 5 is coupled to a main shaft 23 of a transmission mechanism 3a through a sprocket 19, a chain 20, a sprocket 21 and a clutch mechanism 22 so as to be able to cut off or transmit a driving power. A speed change gear train is formed so that the driving power may be selectively transmitted from the main shaft through a speed change shaft 24 and/or an intermediate shaft 25 to a transmission output shaft 26, and the front and rear wheels 8 and 9 are driven by the transmission output shaft 26. The oil pump 17 is fixed to an upper front portion of this transmission casing 3 by means of bolts 27. The illustrated oil pump 17 is a gear pump having mutually meshed drive gear 28 and driven gear 29, a shaft of the drive gear 28 is engaged with a shaft of a gear 30, which is in turn meshed with a gear 31 fixed to the transmission input shaft 5. Since this gear 31 is provided on the engine side with respect to the above-mentioned clutch mechanism 22, the oil pump 17 can be always driven to transmit a driving power to the working machine when the engine 2 is rotating regardless of the operating state of the clutch mechanism 22. The oil pump 17 can be also utilized as a lubricant oil pump for feeding lubricating oil into the transmission casing 3. It is a common practice that normally in such type of tractor a clutch is provided integrally with an engine, hence in order to make an oil pump operate regardless of the operating state of the clutch, the oil pump had to be directly coupled to the engine, but in the illustrated embodiment, owing to the fact that the clutch mechanism 22 is disposed within the transmission casing 3, it has become possible to mount the oil pump 17 to the transmission casing 3 as separated from the engine 2. Moreover, since an engine associated with a clutch is not necessitated, it is also possible to readily replace an engine by a spare engine.

Figure 8:
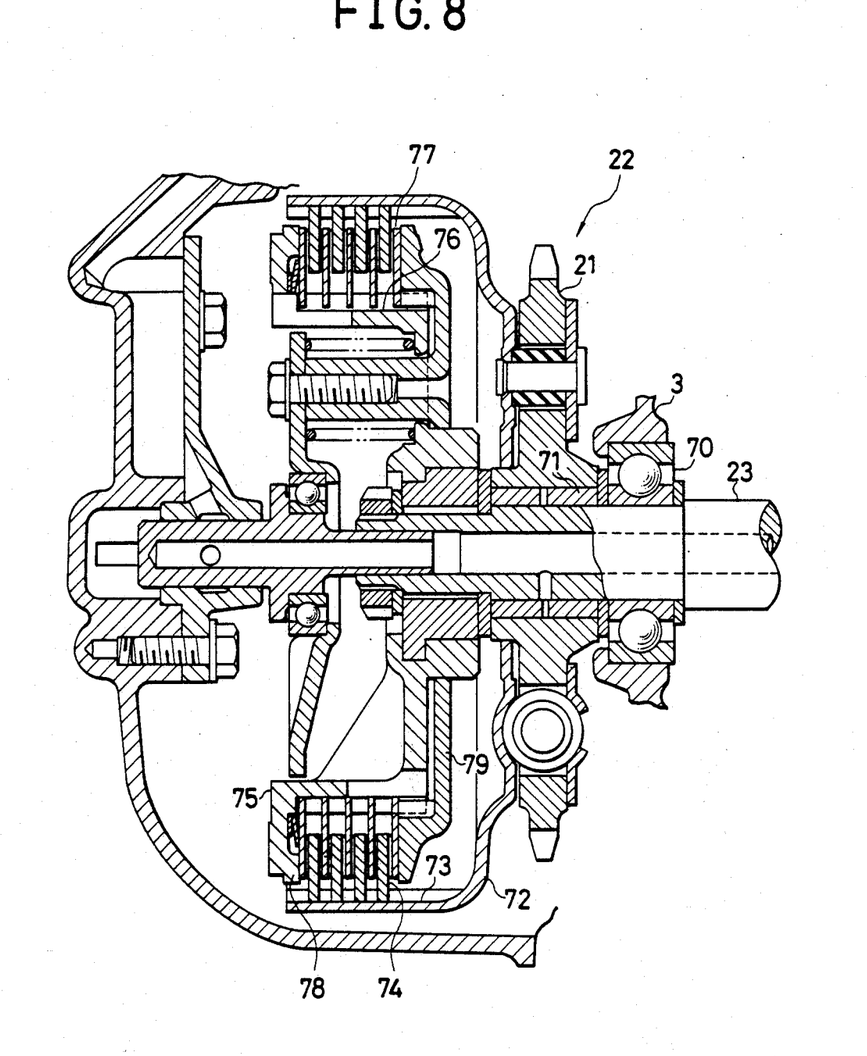
FIG. 8 is a longitudinal cross-sectional view of a clutch.

FIG. 8 is a detailed cross-sectional view of the clutch mechanism 22. The above-described main shaft 23 is pivotably supported from the transmission casing 3 via ball bearings 70, and on this main shaft 23 is supported the above-described sprocket 21 via slide bearings 71 so as to be rotatable relative to each other. To the sprocket 21 is fixedly secured a bottomed cylindrical drive member 72. Spline grooves 73 are provided on the inner circumferential surface of the drive member 72 as aligned with each other, and a plurality of driving clutch plates 74 are accommodated in these spline grooves 73 so as to be displaceable in the axial direction. Also, a nearly bottomed cylindrical driven member 75 is integrally secured to the main shaft 23. Then, spline grooves 76 are provided on the outer circumferential surface of this driven member 75 as aligned with each other, and a plurality of driven clutch plates 77 are accommodated in these spline grooves 76 so as to be displaceable in the axial direction. A disc-shaped pressure plate 79 having nearly the same diameter as a flange 78 provided at an end portion of the driven member 75 is provided so that it can rotate integrally with the driven member 75 and yet can displace relatively in the axial direction. By moving this pressure plate 79 in the axial direction towards the flange 78, the above-mentioned clutch plates 74 and 77 are pinched between the pressure plate 79 and the flange 78 to be pressed against each other, so that rotation of the sprocket 21 can be transmitted through the drive member 72, clutch plates 74 and 77 and driven member 75 to the main shaft 23. If the pressure plate 79 is retracted, the driving clutch plate 74 and the driven clutch plates 77 are separated from each other, and hence the above-mentioned transmission of rotation is cut off.

Figure 3:
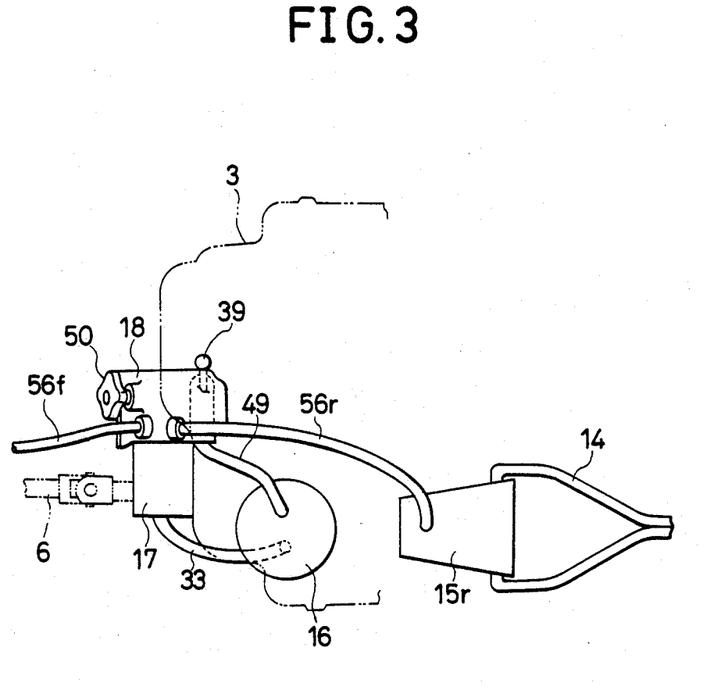
FIG. 3 is a schematic plan view showing an arrangement of a hydraulic system.
Figure 4:
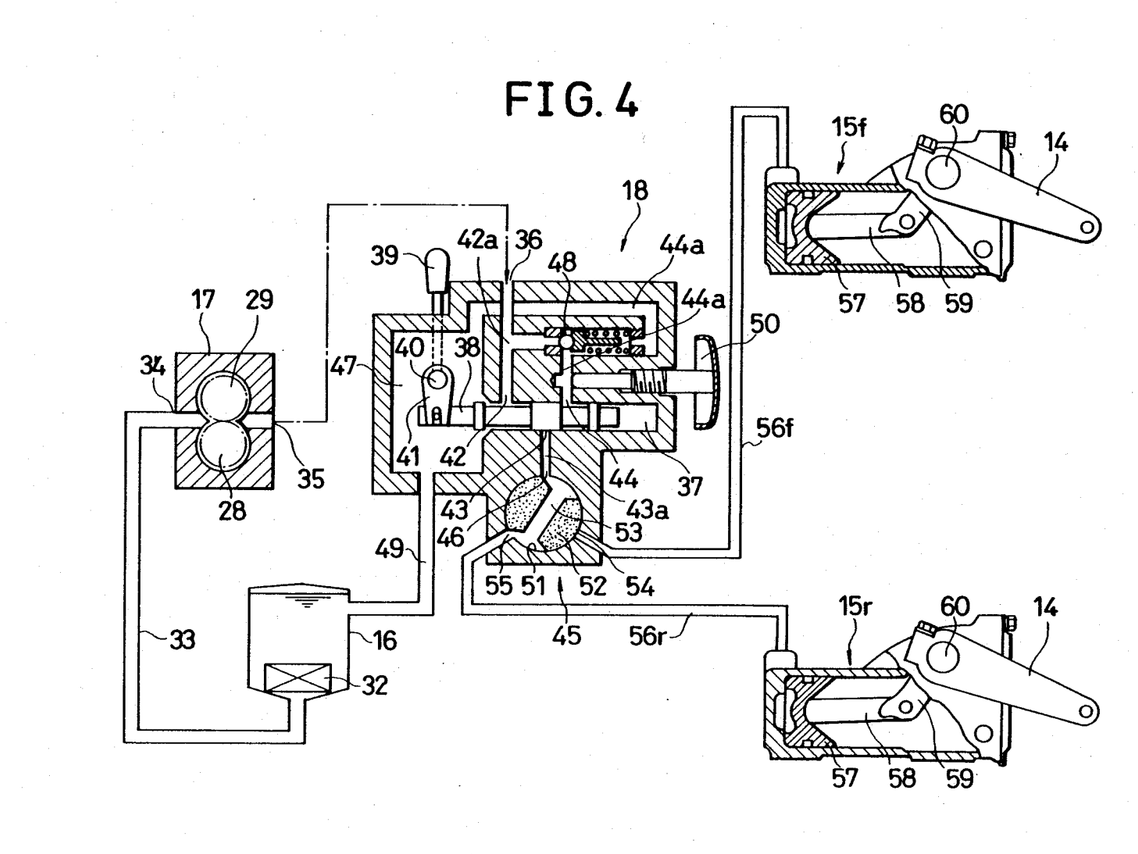
FIG. 4 is a system diagram showing schematic structures of respective component parts forming the hydraulic system and a hydraulic circuit.

FIG. 3 is a plan view showing an arrangement of the respective component parts of the hydraulic system above the transmission casing 3 and under the rider's seat 7. As will be seen from the figure, a control valve 18 is directly fixed to the oil pump 17 as by bolts, and hence, a delivered oil from the oil pump 17 is directly fed to the control valve 18 without passing through a piping. FIG. 4 is simplified illustration of the internal structures of the respective component parts and the hydraulic system shown in FIG. 3. As shown in these figures, a working oil stored within an oil tank 16 is fed from the bottom of the oil tank 16 through a filter 32 and an oil feed pipe 33 to a suction port 34 of the oil pump 17, and after the working oil has been pressurized by the oil pump 17, it is delivered from a delivery port 35. As described previously, the delivery port 35 coincides with an inlet 36 of the control valve 18, and so, the oil delivered from the oil pump 17 is directly supplied into the control valve 18. The control valve 18 is provided with a cylinder 37 and a spool 38 fitted in this cylinder 37, and this spool 38 is made to slide to the left and the right within the cylinder 37 via an arm piece 41 fixedly secured to a shaft 40 by rotating the shaft 40 by means of a lever 39. The cylinder 37 is provided with a feed port 42, a delivery port 43 and an exhaust port 44 as separated from one another at an appropriate interval in the axial direction, the feed port 42 communicates with the above-mentioned inlet 36 via a feed passageway 42a, the delivery port 43 communicates with an oil feed port 46 of a 2-way switching valve 45 via a delivery passageway 43a, and the exhaust port 44 communicates with a return chamber 47 via an exhaust passageway 44a. Between the feed passageway 42a and the exhaust passageway 44a is disposed a relief valve 48, so that if a delivery pressure of the oil pump 17 should rise higher than a predetermined value, the delivered oil is allowed to escape through this relief valve 48 to the return chamber 47. The return chamber 47 is communicated with the top of the oil tank 16 through a return pipe 49.

Figure 5:
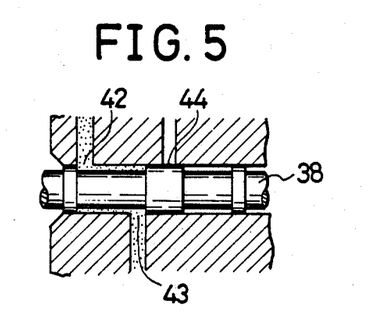
FIGS. 5 to 7 are longitudinal cross-sectional views respectively showing different operation states of a control valve.
Figure 6:
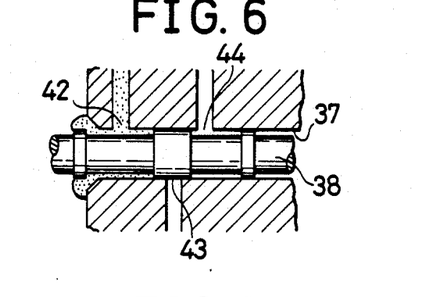
Figure 7:
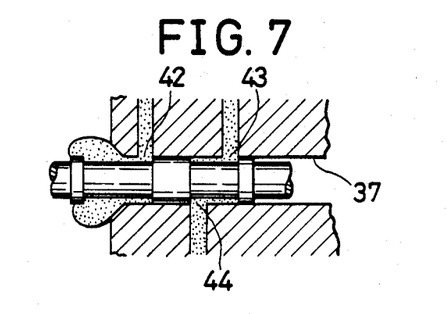

In FIG. 4, since the spool 38 is placed at its neutral position and hence the feed port 42 is communicated with the return chamber 47 through the cylinder 37, the oil supplied from the oil pump 17 into the control valve 18 is in itself returned to the oil tank 16 through the return chamber 47 and the return pipe 49, and therefore, the hydraulic cylinder 15 does not operate (See FIG. 6). Starting from the neutral state, if the lever 39 is rotated in the anti-clockwise direction as viewed in FIG. 4, then the spool 38 comes to an elevating position illustrated in FIG. 5, where the feed port 42 and the delivery port 43 are communicated with each other, hence the oil delivered from the oil pump 17 is supplied through the delivery passageway 43a to the hydraulic cylinder 15, so that the hydraulic cylinder 15 operates to elevate the rocking arm 11 (FIG. 1). Whereas, if the lever 39 is rotated in the clockwise direction as viewed in FIG. 4, then the spool 38 comes to a lowering position illustrated in FIG. 7, where the feed port 42 is communicated with the return chamber 47 through the cylinder 37 and also the delivery port 43 and the exhaust port 44 are communicated with each other, hence the oil within the hydraulic cylinder 15 is allowed to escape through the exhaust passageway 44a to the return chamber 47, and the rocking arm 11 is lowered. In order to mitigate the lowering speed of the rocking arm 11 at this moment, an arm lowering flow rate control valve 50 is provided so that an oil exhaust speed from the hydraulic cylinder 15 can be slowed down by choking the exhaust passageway 44a by means of that valve 50.

A 2-way switching valve 45 is provided integrally with the control valve 18. The 2-way switching valve 45 consists of a valve main body formed integrally with a casing of the control valve 18, and a rotary valve body 52 rotatably fitted in a bore 51 drilled in the valve main body, and in the above-mentioned rotary valve body 52 is formed a valve passageway 53 having its opposite ends expanded and penetrating in a diametrical direction. On the inner circumferential surface of the bore 51 are opened an oil feed port 46 communicating with the above-described delivery passageway 43a and two connecting ports 54 and 55, the connecting port 54 is connected to a hydraulic cylinder 15f at the front portion of the vehicle body through a piping 56f, and the connecting port 55 is connected to a hydraulic cylinder 15r at the rear portion of the vehicle body through a piping 56r. Accordingly, by adjusting an angular position of the rotary valve body 52, a working oil can be fed and exhausted selectively to and from either one of the front hydraulic cylinder 15f and the rear hydraulic cylinder 15r.

As shown in FIG. 4, the hydraulic cylinder 15 (15f or 15r) includes a piston 57 and a piston rod 58 that is swingably connected to the piston 57, and an arm member 59 is pivotably connected to an end portion of the piston rod 58. The other end of the arm member 59 is fixedly secured to a pivotal shaft 60. End portions of this pivotal shaft 60 project externally, and to this projected end portion is fixedly secured the previously described link member 14. Accordingly, when a working oil is fed to the hydraulic cylinder 15 through the piping 56, the link member 14 is rocked upwards in accordance with movement of the piston 57, and hence, the rocking arm 11 which is connected to this link member 14 via the link member 13, is elevated. When a working oil is exhausted from the hydraulic cylinder 15 through the piping 56, the link member 14 is rocked downwards, and the rocking arm 11 is lowered. However, when the above-described spool 38 is placed at the neutral position, since the delivery port 43 is cut off from both the feed port 42 and the exhaust port 44, the piston 57 cannot move, and so, the rocking arm 11 is held at a fixed position.

Figure 9:
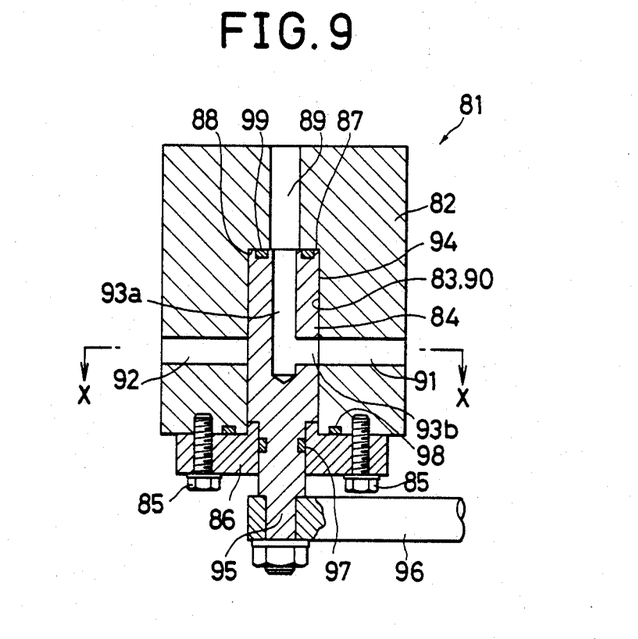
FIG. 9 is a longitudinal cross-sectional view of an improved hydraulic switching valve.
Figure 10:
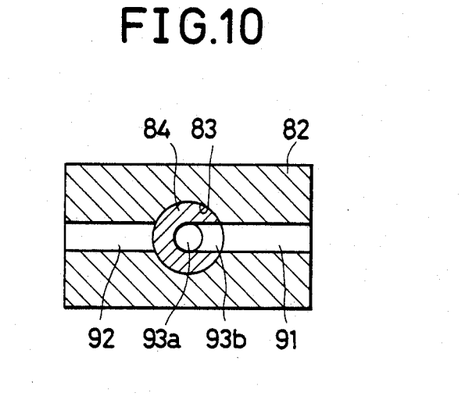
FIG. 10 is a transverse cross-sectional view of the same taken along line X—X in FIG. 9 as viewed in the direction of arrows.

FIG. 9 and 10 illustrate an improved embodiment for the 2-way switching valve 45 shown in FIG. 4. In a 2-way switching valve, that is, hydraulic switching valve 81 according to this modified embodiment, a circular-column-shaped rotary valve body 84 is fitted in a cylindrical bore 83 drilled in a valve main body 82, and the rotary valve body 84 is mounted so as to be freely rotatable about its axis with its outer circumferential surface 94 kept in slide contact with an inner circumferential surface 90 of the bore 83. In addition, this rotary valve body 84 has its end surface 87 pressed against a bottom surface 88 of the bore 83 by the intermediary of a cover 86 which is fastened to the valve main body 82 by means of bolts 85 to block an opening portion of the bore 83.

The valve main body 82 is provided with a first port 89 opening at the above-mentioned bottom surface 88 of the bore 83, and two other ports, i.e., a second port 91 and a third port 92 both opening at the inner circumferential surface 90 of the bore 83, and these ports are respectively communicated with the respective hydraulic passageways in the hydraulic system. On the other hand, the rotary valve body 84 is provided with a valve passageway 93, and this valve passageway 93 consists of a valve passageway portion 93a opening at the above-mentioned end surface 87 and extending in the axial direction towards the interior of the rotary valve body 84, and a valve passageway portion 93b extending from the inner end of the aforementioned valve passageway portion 93a in the radial direction as bent by a right angle and opening at the outer circumferential surface 94 of the rotary valve body 84. The position of opening of the valve passageway portion 93b coincides in the axial direction with the above-described second and third ports 91 and 92. In other words, the valve passageway portion 93b, the second port 91 and the third port 92 are disposed within the same transverse cross-section. It is to be noted that in the illustrated embodiment, the second port 91 and the third port 92 are disposed on the same diameter as opposed to each other.

An outer end portion of the rotary valve body 84 forms a shaft 95, which projects externally as penetrating through the above-mentioned cover 86, and a manipulation lever 96 is fixedly secured to this projecting portion. A gap clearance between the shaft 95 and the cover 86 is sealed by an O-ring 97 to prevent a working oil from leaking out along the shaft 95. Between the cover 86 and the valve main body 82 is also pinched an O-ring 98 for preventing leakage of a working oil.

In addition, between the end surface 87 of the above-mentioned rotary valve body 84 and the bottom surface 88 of the bore 83 is also provided an O-ring, that is, a seal member 99 so as to surround the first port 89, and thereby a working oil is prevented from leaking from the first port 89 along the outer circumferential surface 94 of the rotary valve body 84 into the bore 83.

Alternatively, the aforementioned seal member could be provided between the inner circumferential surface 90 of the bore 83 and the outer circumferential surface of the rotary valve 84 so as to surrounded the valve passageway 93.

Since the modified 2-way switching valve is constructed as described above, by rotating the rotary valve body 84 by manipulating the manipulation lever 96, the valve passageway 93 that is continuously communicated with the first port 89 can be selectively connected to either one of the second port 91 and the third port 92, thereby a hydraulic passageway can be switched either from the first port 89 to the second port 91 or from the first port 89 to the third port 92, and also the first port 89 can be cut off from either one of the second port 91 and the third port 92.

In the state shown in FIG. 9 and 10, the first port 89 is connected through the valve passageway to the second port 91, and at this moment with regard to a route through which a working oil incoming from the first port 89 may possibly leak to the third port 92, there exist a leakage route leading from the first port 89 through a gap clearance between the bottom surface 88 of the bore 83 and the end surface 87 of the rotary valve body 84 and a gap clearance between the inner circumferential surface 90 of the bore 83 and the outer circumferential surface 94 of the rotary valve body 84 to the third port 92, and a leakage route leading from the opening portion of the valve passageway portion 93b through a gap clearance between the inner circumferential surface 90 of the bore 83 and the outer circumferential surface 94 of the rotary valve body 84 to the third port 92. However, the former leakage route is sealingly cut off by the O-ring 99, and the latter leakage route is also cut off due to the fact that the rotary valve body 84 is pressed against the side of the third port 92 by the hydraulic pressure generated on the side of the second port 91 and thereby the third port 92 is blocked. In the case where the first port 89 is connected to the third port 92 also, the situation is quite the same.

As described above, according to the modified embodiment of the switching valve, since leakage of a working oil to the disconnected side can be prevented by a sealing effect of the seal member 99 and by blocking of a disconnected side port caused by a pressure difference between the respective ports 91 and 92, a good sealing property can be provided with a small-sized simple structure, moreover there is no need to extremely enhance a fitting precision between the bore 83 and the rotary valve body 84, and so, a machining cost can be lowered.

Figure 11:
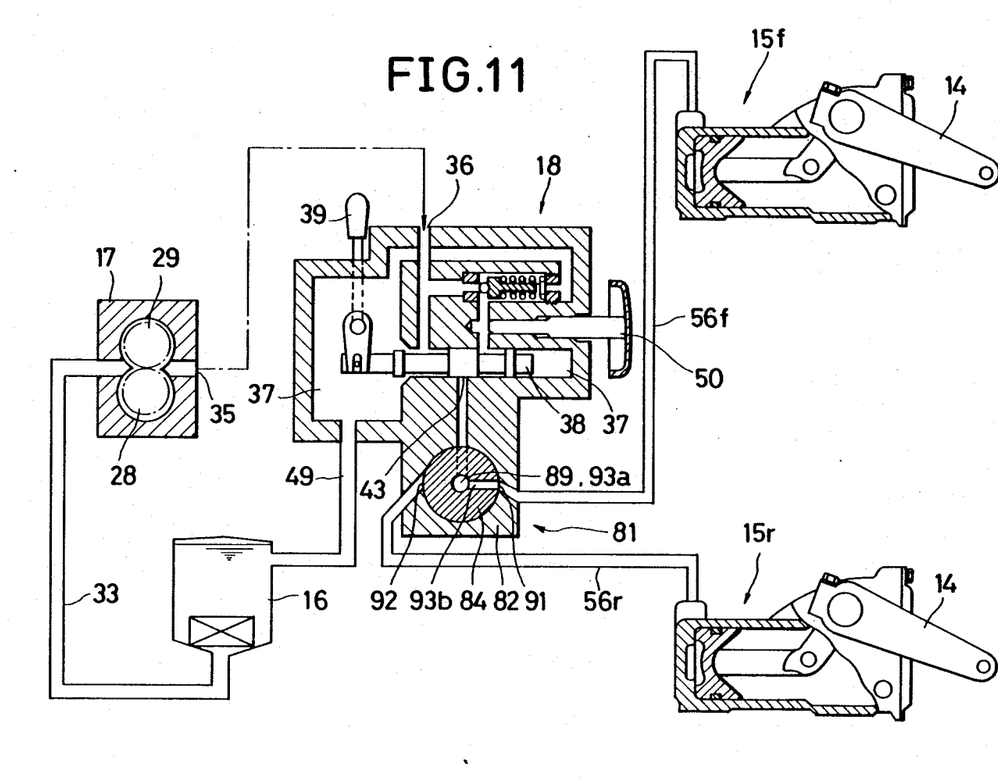
FIG. 11 is a system diagram similar to FIG. 4, but in which a hydraulic switching valve is replaced by the improved hydraulic switching valve illustrated in FIGS. 9 and 10.

FIG. 11 is a system diagram of the hydraulic system according to the present invention, in which the above-described improved 2-way switching valve 81 is employed between the control valve 18 and the hydraulic cylinders 15f and 15r, in place of the 2-way switching valve 45 in FIG. 4. Except for the 2-way switching valve 81, the other component parts and their arrangement are identical to those shown in FIG. 4, and so, they are designated by like reference numerals. Also, component parts of the 2-way switching valve 81 which are equivalent to those shown in FIGS. 9 and 10 are given like reference numerals. Therefore, further explanation of the construction and operation of the hydraulic system shown in FIG. 11 will be omitted. However, it is to be noted that although the second port 91 and the third port 92 are not opened exactly at the diametrically opposed position in FIG. 11, so long as the second and third ports are substantially opposed to each other, the prevention of oil leakage by blocking of a disconnected side port caused by a pressure difference between the opposed ports, is still effective.

As described in detail above, according to the present invention, since an oil pump is fixed secured to a casing block of a transmission system separated from an engine, a hydraulic system would not be directly influenced by vibration of an engine, and so, a flexible piping is not necessitated.

In addition, since a control valve is directly fixed to an oil pump and further a 2-way switching valve is provided integrally with the control valve, high-pressure pipings for connecting these members with one another would become unnecessary, hence a number of parts is reduced and a manufacturing cost can be lowered.

Furthermore, as the hydraulic system can be assembled in a compact manner, it can be advantageously equipped on a vehicle body.

What is claimed is:

1. A hydraulic system in a working vehicle of the type that an engine and a transmission in a transmission housing are separately disposed on a vehicle body apart from each other adjacent the back and front of said vehicle and are drivably coupled to each other by a drive shaft connected at one of its ends to said engine and at its other end to the input shaft of said transmission; characterized in that the input shaft of said transmission is drivably coupled to said transmission through a clutch mounted on said housing and an oil pump is secured to said transmission housing, said oil pump being drivably coupled to said input transmission shaft.

2. A hydraulic system as claimed in claim 1, wherein a control valve is fixedly secured to said oil pump, and a delivery port of said oil pump is directly coupled to an inlet of said control valve.

3. A hydraulic system as claimed in claim 2, wherein a hydraulic switching valve for switching hydraulic passageways is provided integrally on an outlet side of said control valve.

4. A hydraulic system as claimed in claim 1, 2 or 3, including a hydraulic switching valve comprising a valve main body provided with a cylindrical bore, a circular-column-shaped rotary valve body rotatably and slidably fitted in said cylindrical bore, said valve main body being provided with a first port opening at the bottom surface of said cylindrical bore and second and third ports opening at the inner circumferential surface of said cylindrical bore substantially opposed to each other, said rotary valve body being provided with a valve passageway which communicates with said first port at its end surface, extends in the axial direction from said end surface towards the interior of said valve body, bends at its inner end in the radial direction and opens at its outer circumferential surface so as to be selectively communicated with said second or third port, and a seal member provided between said cylindrical bore and said rotary valve body so as to surround the communicating portion between said first port and said valve passageway.

* * * * *